Patented Mar. 25, 1924.

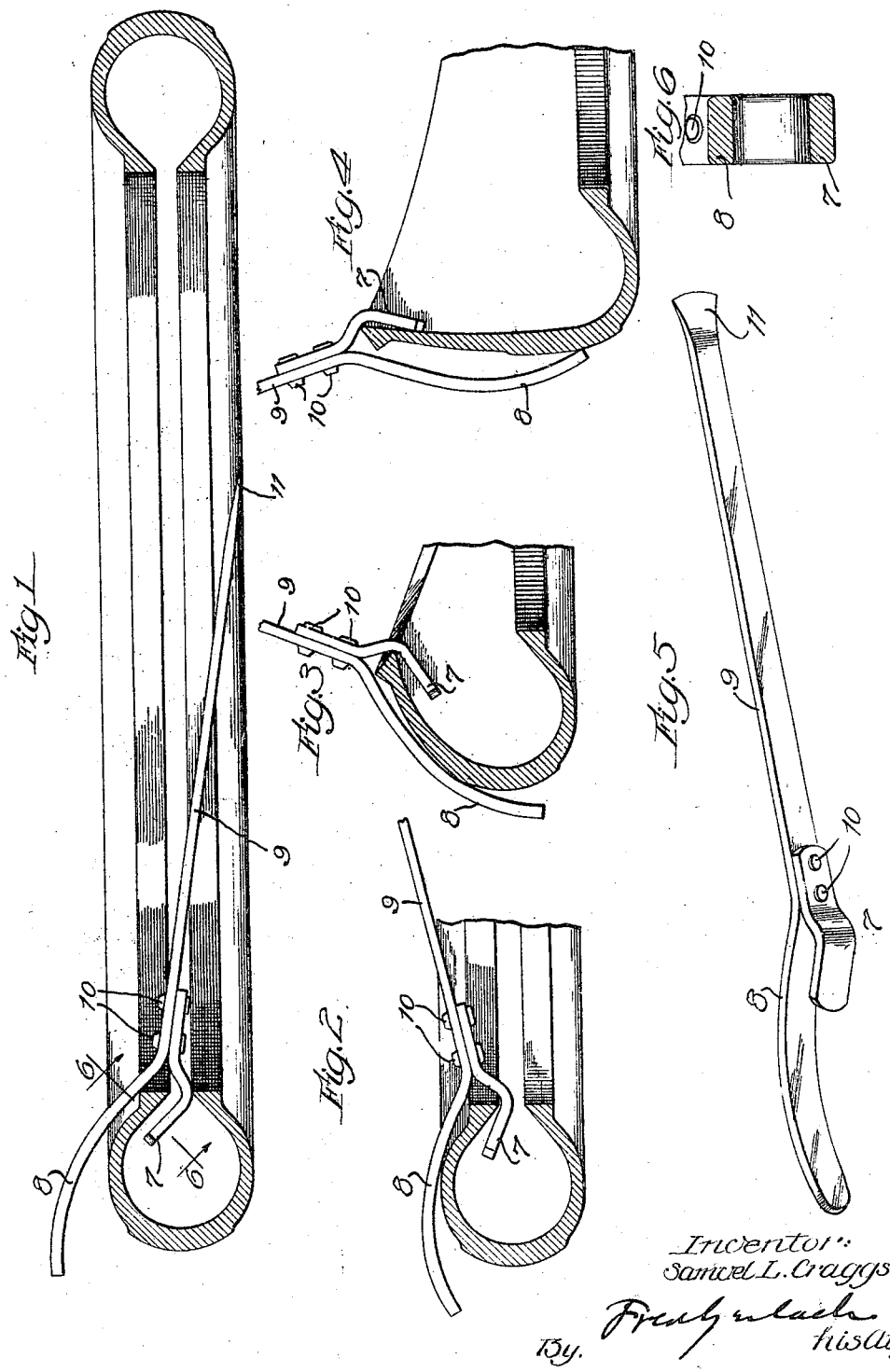

1,488,096

UNITED STATES PATENT OFFICE.

SAMUEL L. CRAGGS, OF CHICAGO, ILLINOIS.

TIRE TOOL.

Application filed January 19, 1922. Serial No. 530,255.

*To all whom it may concern:*

Be it known that I, SAMUEL L. CRAGGS, a citizen of the United States, and a resident of Chicago, in the county of Cook and State of Illinois, have invented certain new and useful Improvements in Tire Tools, of which the following is a full, clear, and exact description.

The invention relates to tire tools and more particularly to those designed for spreading tire casings for inspection of, or repair to, the inner periphery or for facilitating the insertion or removal of inner tubes.

The object of the invention is to provide a tool of this character which is simple in construction and efficient in operation, so that one side of a casing may be separated as widely as possible from the other.

The invention consists in the several novel features hereinafter set forth and more particularly defined by claims at the conclusion hereof.

In the drawings: Fig. 1 is a sectional view of a tire casing with the improved tool therein. Figs. 2, 3 and 4 are similar views, showing different positions assumed in spreading the tire casing. Fig. 5 is a perspective of the tool. Fig. 6 is a section of the tool on line 6—6 of Fig. 1.

The invention is exemplified in a tool which comprises a short member 7 adapted to hook around the inner margin of one side of a casing and to engage the inner periphery thereof, a long curved outer member 8 adapted to engage, and bear against, the outer surface of the same side of the casing, and a handle 9, all rigid with one another. The members and handle are formed of flat strips of metal which may be easily cut and forged or bent to the desired shape, handle 9 being integral with the member 8 and member 7 being formed of a short flat strip of metal which is united by rivets 10 to the long strip forming the other member and handle. The outer end of handle 9 is flattened and tapered, as at 11, to form a prying blade operable by the handle 9. Members 7 and 8 adjacent the hande 9 are substantially parallel and spaced apart sufficiently to receive the inner marginal portion of one side of a tire. The inner short hook member 7 is adapted to extend into the tire-casing and is comparatively short so it will engage the marginal portion of the casing for that purpose, while the outer member 8 is considerably longer than member 7 and is curved inwardly or towards the casing so as to efficiently prevent the tool from slipping off the casing while it is being operated to flex the casing side outwardly, and so that as the tool is operated from the initial or inserting position shown in Fig. 2 to the maximum spreading position shown in Fig. 4, it will roll or ride on the outer surface of the casing progressively away from the casing margin until the casing is opened to the greatest extent, at which time the outer end of member 8 will engage the tread portion of the tire. By reason of this formation of the outer member, the bearing point between the outer member and the tire gradually moves away from the margin of the casing under flexure to make possible the maximum spreading. The short inner member 7 remains in substantially fixed relation to that side of the tire which is being flexed outwardly. As the handle 9 is swung upwardly and outwardly, the member 8 rolls or rides on the outer surface of the tire so as to recede from the margin held by member 7 and so that when the tool has reached the position shown in Fig. 4, the casing will have been spread to the fullest extent, by reason of the bearing-point between the outer member and the casing being then adjacent the tread and remote from the inner member. This, in practice, has been found to be an important advantage in tire tools of this character. The handle 9 is angled with respect to the plane of members 7 and 8 where they are substantially parallel and merge at the handle to facilitate the placement of the members into hooked relation with one side of the tire, as shown in Fig. 1 and without lifting the casing from the floor or table. By forming these tools of substantially flat strips of metal, they can be produced at a low cost and without expensive dies. The bends necessary to form the members and handle are simple and by separately forming the members and securing them together, waste in the metal is avoided.

The invention is not to be understood as restricted to the details set forth, since these may be modified within the scope of the appended claims, without departing from the spirit and scope of the invention.

Having thus described the invention what

I claim as new and desire to secure by Letters Patent, is:

1. A tire tool comprising a pair of relatively rigid members and a handle, one of said members being comparatively short and adapted to hook around the inner margin of one side of a tire casing and the other of which is curved conformably to the outside of the casing and of sufficient length to engage the outer portion of the casing at a point remote from the point engaged by the short member when the handle has been swung to spread the casing.

2. A tire tool comprising a handle and a pair of substantially parallel members one of which is of sufficient length to extend around and engage and which is curved conformably to the outer side-portion of a tire-casing and the other of which is comparatively short and is adapted to engage the inner face of the casing adjacent one of its margins, said members and the handle consisting of strips of transversely flat metal rigidly secured together, the handle being bent at an angle relatively to the said members.

SAMUEL L. CRAGGS.